United States Patent [19]

Buschor et al.

[11] 4,450,949

[45] May 29, 1984

[54] MACHINE FOR TRANSPORTING AND STACKING LOADED CARTONS

[75] Inventors: Josef J. Buschor, Los Gatos; James C. Long, San Jose; Dieter K. Schmidt, Los Gatos, all of Calif.

[73] Assignee: Five X Corporation, Santa Clara, Calif.

[21] Appl. No.: 335,060

[22] Filed: Dec. 6, 1982

[51] Int. Cl.³ ............................................. B65G 57/00
[52] U.S. Cl. ....................................... 198/422; 414/29
[58] Field of Search .................. 198/422, 447; 414/29, 414/89

[56] References Cited

U.S. PATENT DOCUMENTS 4,307,800  12/1981  Joa ........................................ 198/422

Primary Examiner—Joseph E. Valenza
Assistant Examiner—Jonathan D. Holmes
Attorney, Agent, or Firm—Edward B. Gregg

[57] ABSTRACT

Machine for transporting and stacking cartons loaded with containers comprising two transport systems one above the other with restraining means to restrain motion of each loaded carton on one or the other or both systems, and pusher means which releases the restrained carton or cartons and pushes both of them in unison and with one above the other to a delivery point where the upper carton is deposited on the lower carton.

4 Claims, 8 Drawing Figures

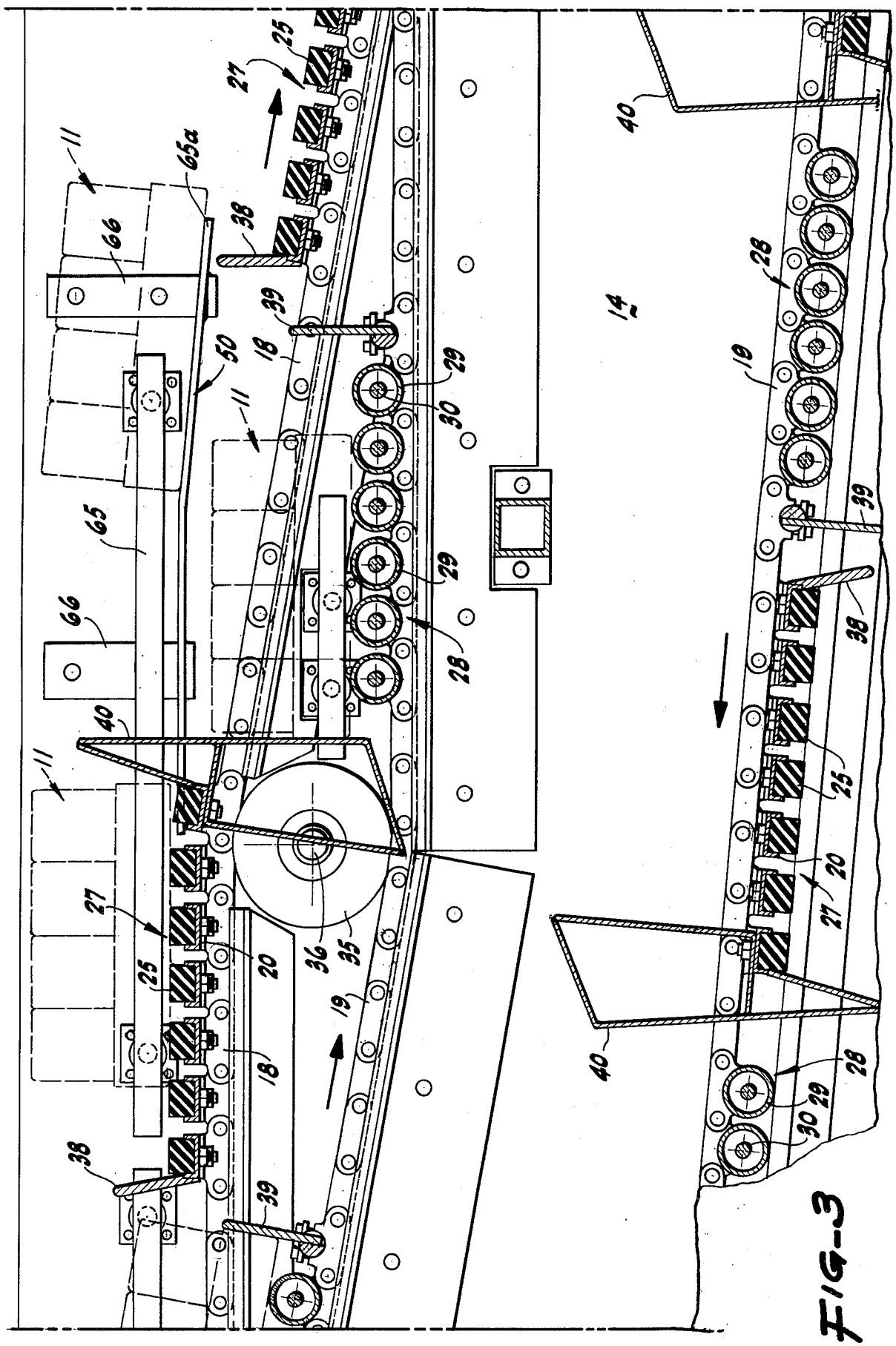

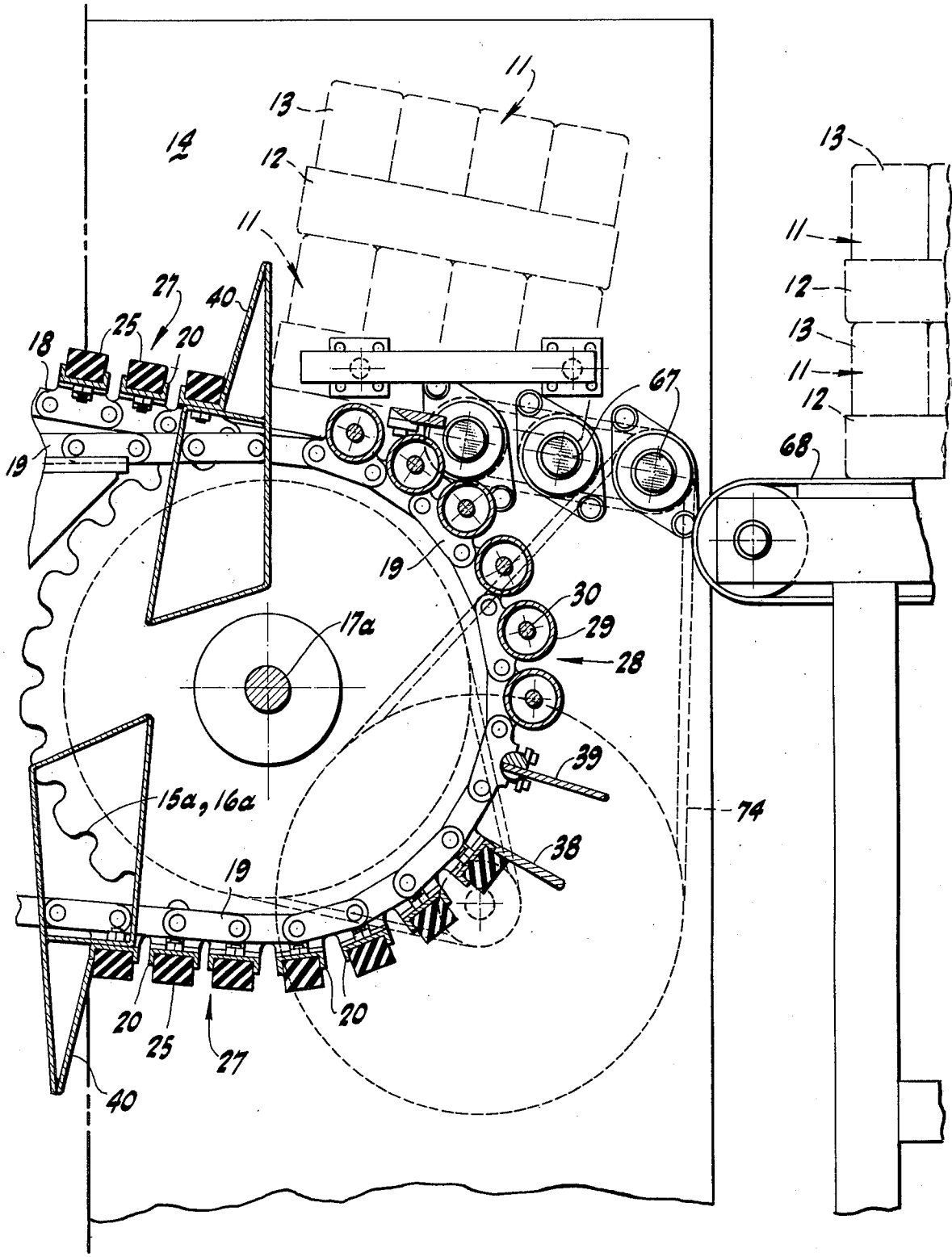

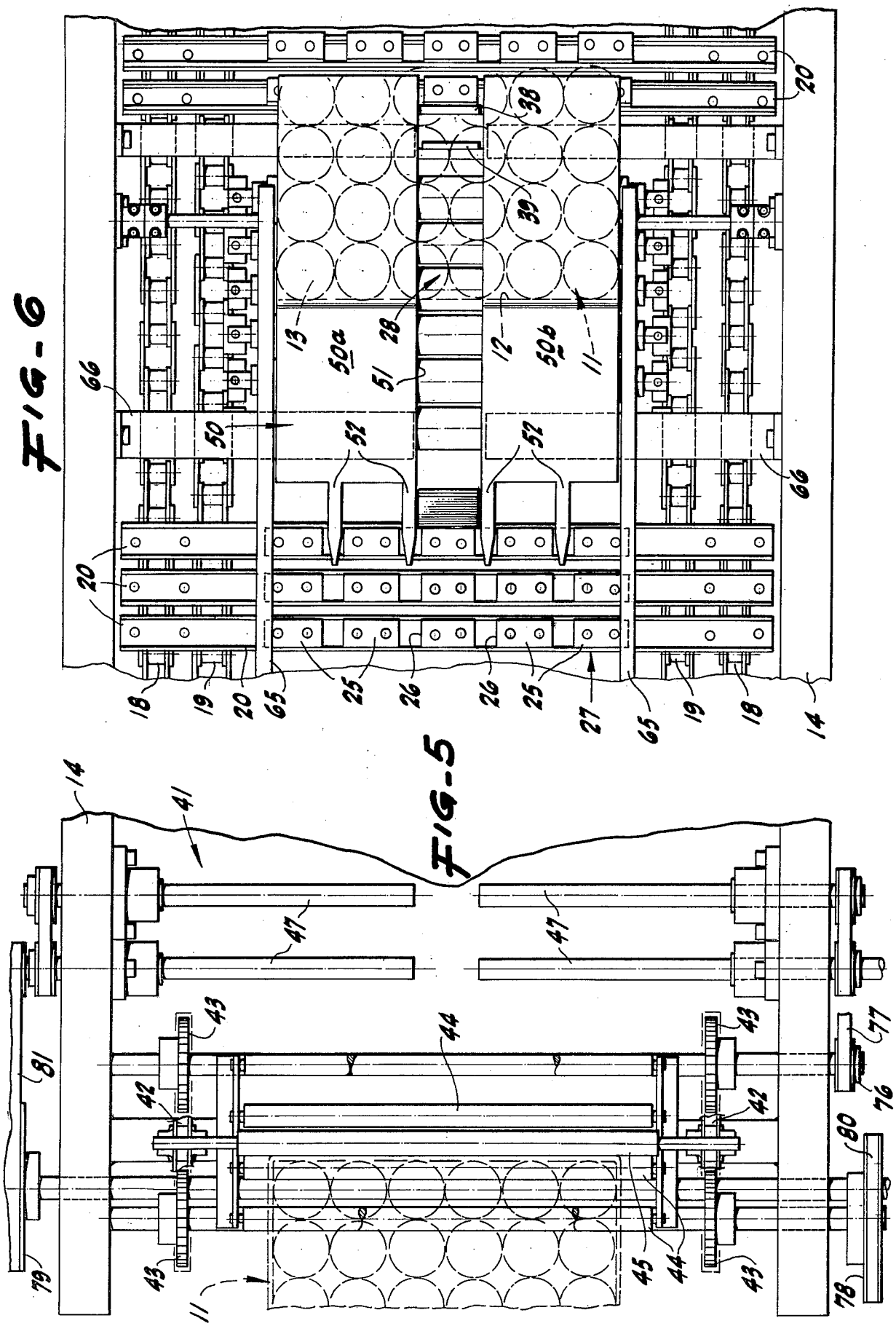

MACHINE FOR TRANSPORTING AND STACKING LOADED CARTONS

This invention relates to a machine for transporting and stacking loaded cartons.

The type of article which is transported and stacked by the machine of the present invention consists of a shallow carton of paperboard and a number of containers, such as cylindrical metal cans, seated and nested in the carton. It is customary to stack these loaded cartons two high with one on top of the other, and each pair of loaded cartons is then wrapped with a heat-shrink film which holds the two carbons together during transport and storage.

Equipment available heretofore for the purpose of transporting and stacking loaded cartons of this nature have been slow in their operation and are intermittent.

It is an object of the present invention to provide improvements in machinery for transporting and stacking loaded cartons of the character described.

It is a further and particular object of the invention to provide a machine for transporting and stacking loaded cartons of the character described which is continuous in its operation.

Yet another object of the invention is to provide a machine of the character and for the purpose described which, in addition to being continuous in its operation, will also accurately register each upper loaded carton with its companion lower loaded carton.

The above and other objects of the invention will be apparent from the ensuing description and the appended claims.

One embodiment of the invention is illustrated by way of example in the accompanying drawings, in which:

FIG. 3 is a similar view, being a continuation of the view shown in FIG. 2;

FIG. 4 is a similar section through the exit end of the machine and is a continuation of FIG. 3;

FIG. 5 is a view along the line 5—5 of FIG. 1 with certain parts removed to reveal more clearly parts of the drive mechanism;

FIG. 6 is a view taken along the line 6—6 of FIG. 1, also with parts removed to reveal more clearly certain features of interior construction;

Figure 1:
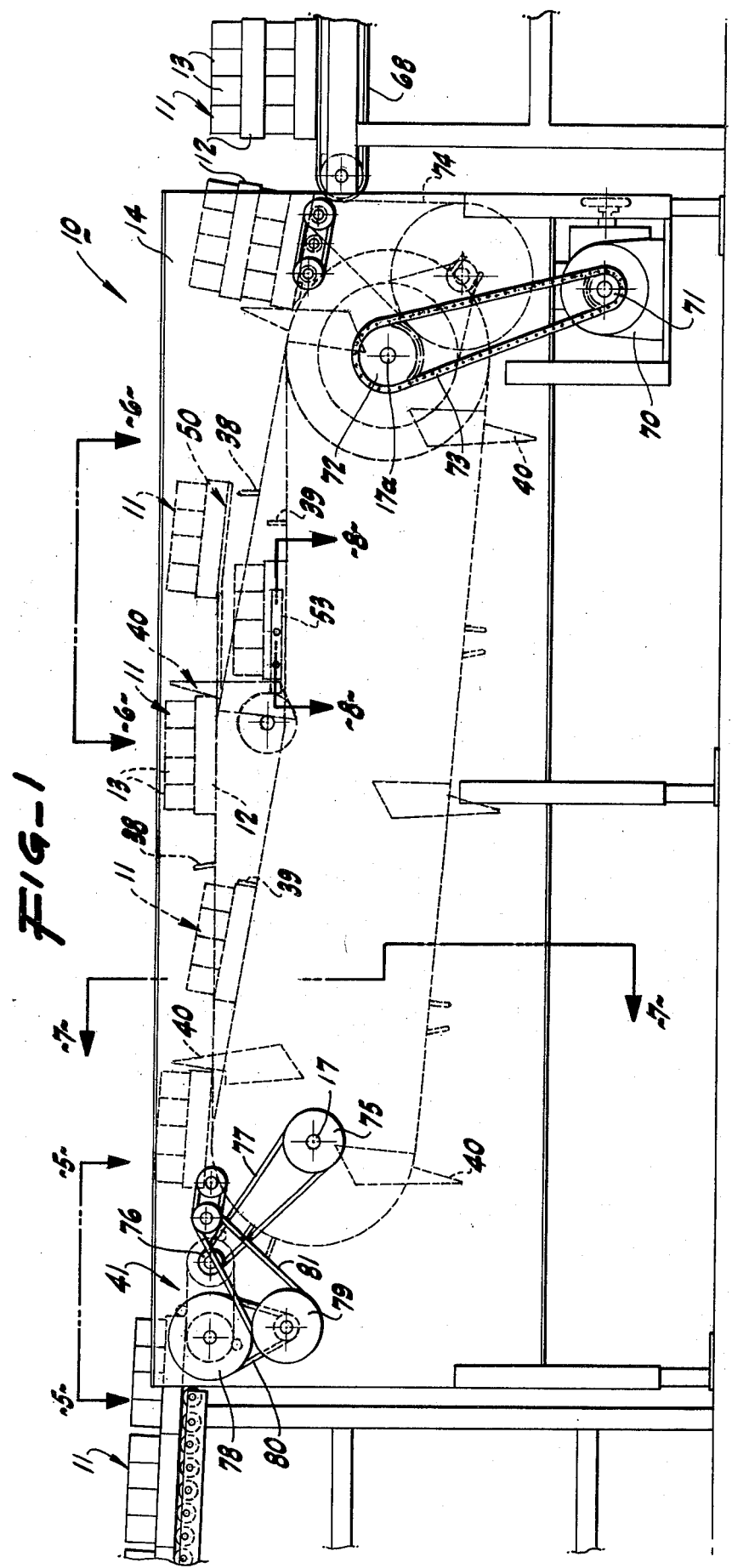
FIG. 1 is a somewhat diagrammatic view of the machine in side elevation with frame plates removed to reveal the interior mechanism and mode of operation.
Figure 2:
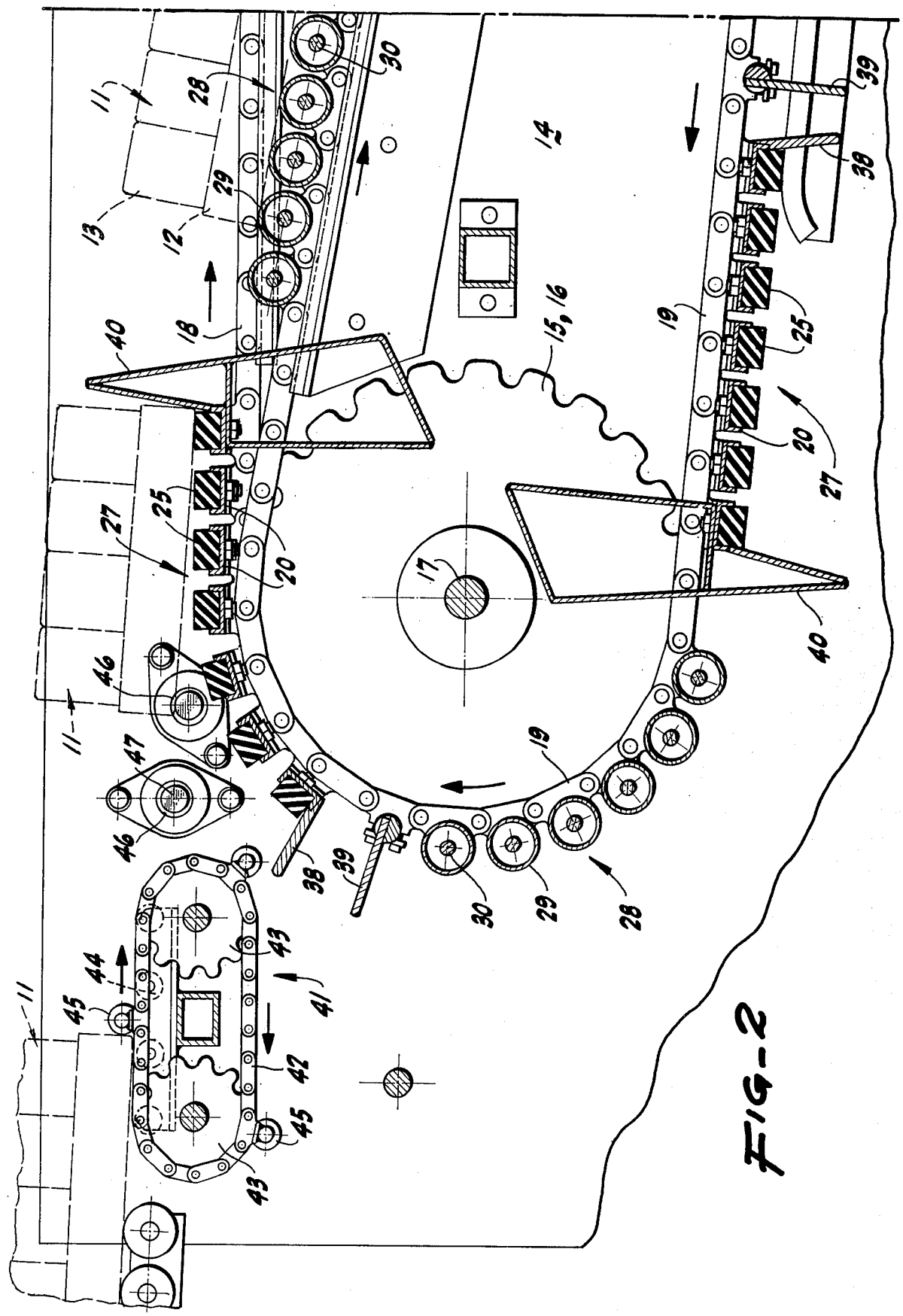
FIG. 2 is a vertical mid-section through the entry end of the machine.
Figure 7:
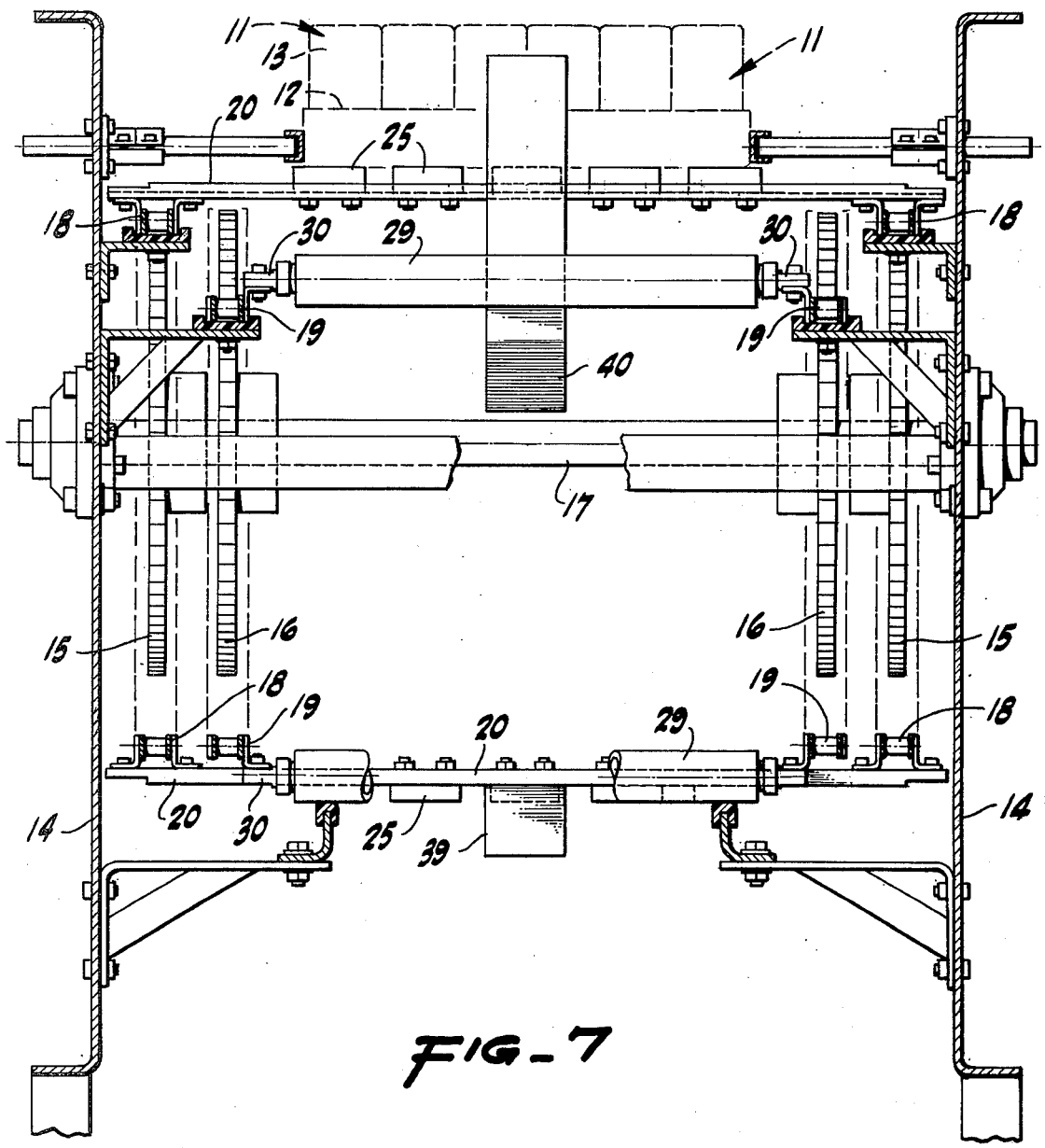
FIG. 7 is a section taken along the line 7—7 of FIG. 1.

Referring now to the drawings, the machine is generally designated by the reference numeral 10. It is intended to handle loaded cartons 11 each consisting of a shallow, paperboard carton 12 and containers 13. The containers are shown as cylindrical containers but they may have other shapes. Typically a carton such as shown is square being about 11 inches by 14 inches in horizontal dimensions and about 4½ inches deep. Typically also metal containers carrying 12 ounces of fluid, for example soft drink beverage, are deposited in these cartons. These containers may be in groups of four or six which are held together by a plastic holder of a type which is well known in the art. The deposit of containers in the cartons is performed upstream from the machine 10 by means well known in the art.

The machine 10 has a frame 14. A pair of outer sprockets 15 and a pair of inner sprockets 16 are provided at the entry end of the machine (at the left as shown in FIG. 1) and are mounted on the same shaft 17 and have the same diameter. Similar outer sprockets 15a and inner sprockets 16a are mounted on a similar shaft 17a at the exit end of the machine (to the right as viewed in FIG. 1). The shaft 17a is located at a lower level then the shaft 17. Outer chains 18 engage the outer sprockets 15, 15a and inner chains 19 engage the inner sprockets 16, 16a. Groups of channel bars 20 are connected to the outer chains and blocks 25 are supported within and attached to the channel bars 20. The blocks 25 are typically of a low friction material such as Teflon. As will be seen, there are spaces 26 between the blocks 25 and the blocks are arranged in groups, there being typically five or six such groups although a greater or lesser number may be employed. Each group is identified as an entity by the reference numeral 27.

The inner chains 19 carry groups 28 of rollers 29 which are rotatably mounted on shafts 30 which in turn are fixed to brackets 31 connected to the inner chains 19. These rollers may be of metal construction and they rotate freely on their shafts. As will be seen, there are several groups 28 of rollers 29 which are spaced apart. As will be seen, each group 27 of blocks 25 is followed by and spaced from a group 28 of rollers 29.

A roller 35 mounted on a shaft 36 carried by the frame of the machine is disposed between the inner chains 19 and the outer chains 18 with the result that the outer chains and their groups 27 of blocks 25 travel in a horizontal path from the entry end of the machine to the roller 35 and then downwardly to the outer sprockets 15a at the exit end of the machine whereas the inner chains 19 and their groups 28 of rollers 29 pursue a downwardly slanting or tilted path from the entry end of the machine to the roller 35 and then travel in a horizontal path from the roller 35 to the exit end of the machine.

Each group 27 of blocks 25 carries at its rearward end one or more pusher members 38 and each group 28 of rollers 29 carries at its forward end a stop member 39. Also carried by the outer chains 18 is a pusher member 40 just ahead of each group of blocks. As will be seen the member 40 acts as a stop as well as a pusher.

At the entry end of the machine a transfer assembly 41 is provided comprising conveyor chains 42 mounted on sprockets 43 and provided with rollers 44. The chains 42 are provided with suitably spaced rollers 45 which project above the rollers 44. The loaded cartons are supplied by a continuous belt conveyor (not shown) in a continuous line with each carton abutting the carton ahead. Speed-up or accelerating rollers 46 are provided which are mounted on shafts 47 which receive each loaded carton in turn and accelerate it onto a group 27 of blocks 25 or a group 28 of rollers 29. As a loaded carton on the transfer assembly 41 is contacted from beneath by a roller 45 near its rearward end, the carton is tilted up at its rear and is separated from the following cartons.

The timing is such that one carton is deposited on a group 27 of blocks 25 and the next carton is deposited on the following group 28 of rollers 29.

Referring to FIG. 6, a dead plate 50 is provided which is formed in two sections 50a and 50b with a space 51 between the sections to allow movement of the pusher members 40. Each section of the dead plate is provided with forwardly projecting prongs 52 which are spaced so as to interleave with the blocks 25. It will be apparent that as each upper loaded carton is propelled forwardly it will be moved onto the dead plate and therefore separated from the blocks 25 and will come to a halt. Meanwhile the respective pusher member 40, which acted as a stop member or limited member up to this point, will proceed forwardly toward the exit end of the machine. As will be made apparent it is not a matter of concern where the loaded carton comes to rest on the dead plate 50.

Meanwhile the following loaded carton will proceed in a downwardly inclined path to a position beneath the dead plate 50 and it will roll on the rollers 28 to a position abutting the stop member 39.

Figure 8:
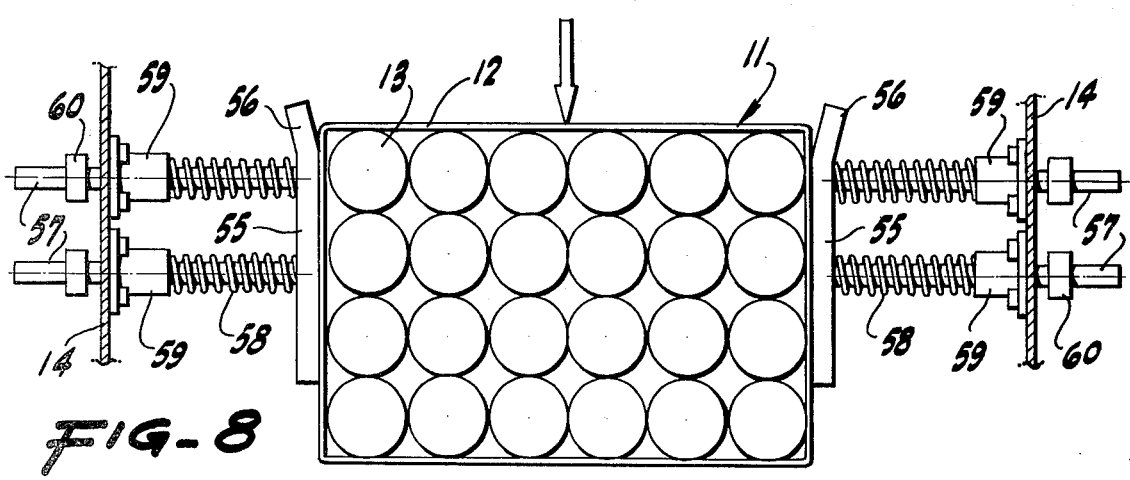
FIG. 8 is a view taken along the line 8—8 of FIG. 1 showing the means for clamping and aligning each lower carton at the point where it is caused to come to a momentary halt.

This position of the lower loaded carton is shown in FIG. 1 at the section line 8—8. At this position the lower loaded carton will be halted by means shown in FIG. 8. Referring to FIG. 8, bars 55 having outwardly tapering entry ends 56 are mounted on rods 57. Springs 58 are lodged between the bars 55 and collars 59. The rods 57 extend slidably through the frame of the machine and the normal, inner portions of the bars 55 are limited by nuts 60. As a loaded lower carton reaches the bars 55 it spreads them and the springs 58 act to clamp the carton in the position shown in FIGS. 1 and 8. The rollers 28 pass by without transporting the carton further.

Next, the following pusher member 40 will contact the upper loaded carton, or the lower loaded carton (or both simultaneously if they are in the same positions in a horizontal direction) and will cause both cartons to move forwardly. The dead plate 50 has a downwardly slanting end portion 65 down which the upper carton travles until it falls off the dead plate onto the lower carton. The drop is not severe because at this point the upper and lower cartons are close to one another. Further it will be apparent that the exact positions of the cartons on the dead plate 50 and between the bars 55 is not critical. The bars 55 will align each lower carton parallel to the line of travel, a function which is performed for the upper cartons by guide rods 65 mounted on frame brackets 66. (See FIG. 6.) As regards the horizontal positions of the upper and lower cartons, they may differ where they come to rest but each pusher member 40 will bring the two cartons into proper alignment so that each upper carton is deposited directly above and in precise registry with the respective lower cartons.

The resulting two high stack (see FIG. 4) will be deposited on speed up rollers 67 and transferred to a conveyor belt 68. The stacks will then be wrapped with a heat shrink film and the film will be heat shrunk by suitable means (not shown) which are well known in the art.

A drive is provided as follows: Shaft 17a is driven by a motor 70, sprockets 71 and 72 and chain 73. A chain 74 (see FIG. 4) driven by a sprocket (not shown) on shaft 17a drives speed up rollers 67. Shaft 17 drives the transfer assembly 41 through sprockets 75 and 76 and chain 77. A sprocket 78 on the transfer assembly 41 drives the speed up rollers 46 through a sprocket 79 and chains 80 and 81. This accomplishes a suitable gear reduction and timing.

We claim:

1. A machine for transporting and stacking packages two-high, each such package comprising a shallow tray loaded with upright containers, said machine having an entry end and an exit end and comprising:
   (a) a first horizontal shaft and a second horizontal shaft at the entry and exit ends, respectively, of the machine,
   (b) a pair of outer sprockets and a pair of inner sprockets on the first shaft and a pair of outer sprockets and a pair of inner sprockets on the second shaft,
   (c) an outer pair of endless chains driven by the outer sprockets and an inner pair of endless chains driven by the inner sprockets,
   (d) said shafts, sprockets and chains being so arranged that the course of the chains is downward from the first shaft to the second shaft,
   (e) means whereby the upper chains move horizontally and then downwardly from the first shaft to the second shaft and the lower chains move downwardly and then horizontally from the first shaft to the second shaft,
   (f) a plurality of first support means mounted on the outer chains and a plurality of second support means mounted on the inner chains, the first and second support means alternating with one another,
   (g) means for delivering such packages to the entry end of the machine whereby the packages are deposited alternately on a first support and on a second support,
   (h) means acting to restrain the forward motion of the packages moved by at least one pair of chains, and
   (i) pusher means for releasing the restrained packages or packages from restraint and moving an upper package and a lower package in unison and in vertical alignment to the exit end of the machine and causing the upper package to be deposited on top of the lower package.

2. The machine of claim 1 wherein there is a restraining means associated with each pair of chains.

3. The machine of claim 2 wherein the restraining means associated with the outer chains is in the form of a plate on which the upper packages are deposited and the restraining means associated with the inner chains is in the form of spring-loaded, parallel side members which part to admit entry of a lower package and then press against the sides of the package to restrain it and to align it parallel to the path of movement.

4. A transport and stacking machine for transporting packages and stacking them two high, said packages comprising a shallow tray loaded with upright containers, said machine having an entry end and an exit end and comprising
   (a) a first horizontal shaft at the entry end and a second shaft parallel to, spaced from and at a lower level than the first shaft, said second shaft being at the exit end,
   (b) a pair of spaced outer sprockets on each shaft and a pair of spaced inner sprockets on each shaft,
   (c) a pair of outer chains driven by the outer sprockets and a pair of inner chains driven by the inner sprockets,
   (d) a plurality of first supports carried by the outer chains and a plurality of second supports carried by the inner chains, such supports alternating whereby packages delivered to the entry end of the machine are deposited alternatively on a first support and a second support, (e) roller means serving to cause the upper course of the outer chains to move horizontally from the inlet end of the machine, then downwardly and to cause the upper course of the inner chains to move downwardly from the inlet end of the machine and then horizontally, whereby packages carried by the second supports move beneath the packages carried by the first supports, (f) a plate located above the outer chains to intercept each package carried by a first support and to restrain it momentarily, (g) means acting also to restrain momentarily each package carried by a second support, and (h) pusher means moving with the chains and acting to release each pair of packages from restraint, to move them forwardly in unison to the exit end of the machine, and to deposit each upper package on a lower package.

* * * * *